April 30, 1935.    M. TIBBETTS    1,999,429
MOTOR VEHICLE
Filed March 7, 1932
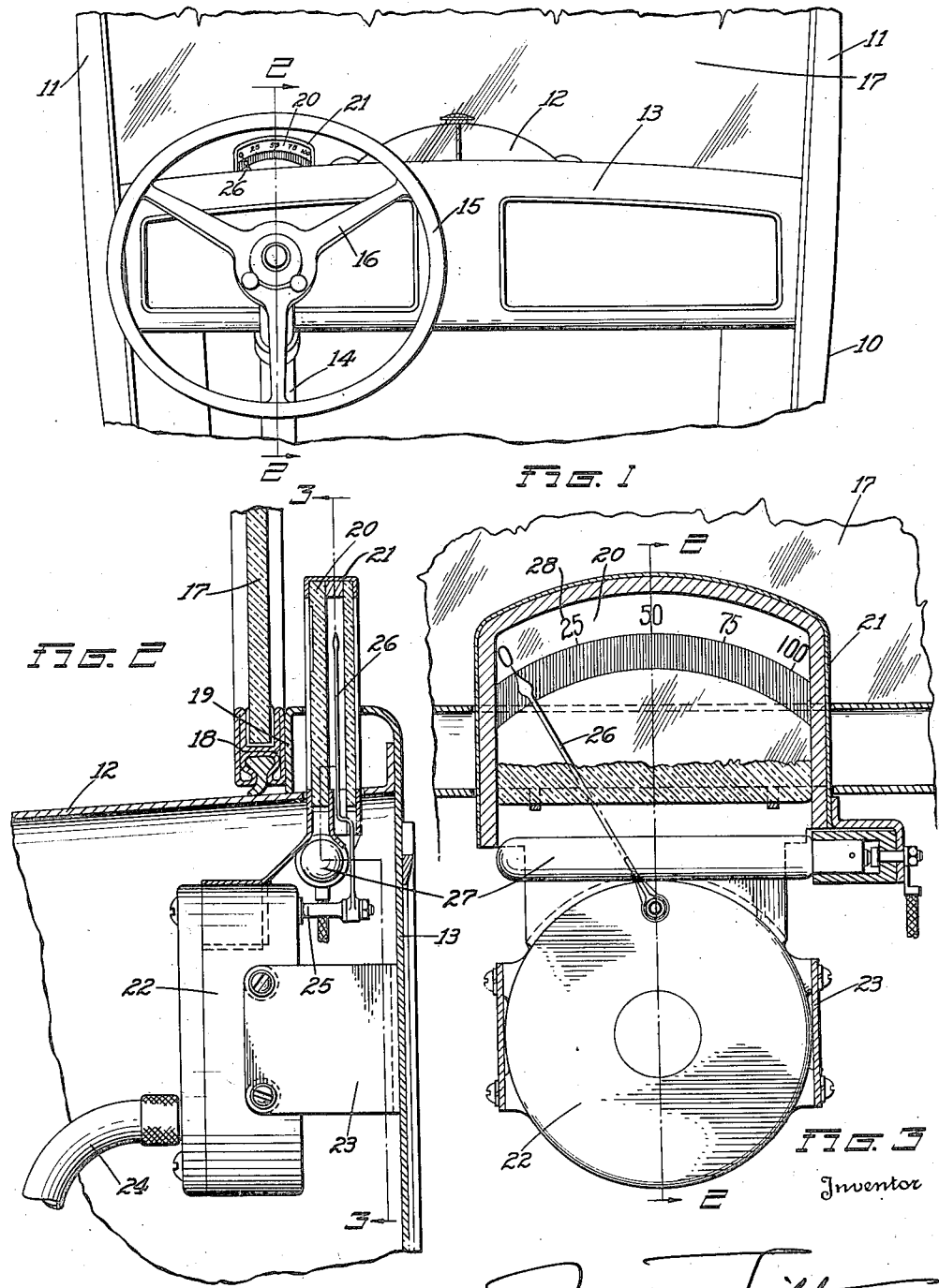
Inventor
Milton Tibbetts Patented Apr. 30, 1935

1,999,429

UNITED STATES PATENT OFFICE.

1,999,429

MOTOR VEHICLE

Milton Tibbetts, Detroit, Mich., assignor to Packard Motor Car Company, Detroit, Mich., a corporation of Michigan Application March 7, 1932, Serial No. 597,207

14 Claims. (Cl. 180—90)

This invention relates to motor vehicles and particularly to the mounting and construction of the speedometer or like instrument.

One of the objects of the invention is to arrange the indicator device of the speedometer or like instrument so that it may be most easily read by the operator of the vehicle.

Another object of the invention is to so arrange the speedometer that it may be observed by the operator without taking his eyes from the windshield or from a direct view ahead.

Another object of the invention is to so arrange the speedometer in relation to the other parts of the vehicle that the indicator device of the speedometer may be read by the operator while he is at the same time looking through the steering wheel and the windshield.

Another object of the invention is to arrange the speedometer directly in front of the operator and very slightly below the line of vision when the operator is looking at the road directly ahead.

Another object of the invention is to provide a speedometer with a transparent dial and so mounted that there will be daylight beyond it from the operator's viewpoint and yet so that it may be readily illuminated edgewise for observation at night.

Another object of the invention is to so form the speedometer mechanism that the speedometer casing may be mounted within the body of the vehicle and the speedometer dial mounted laterally of the casing so that the casing will not prevent the use of a transparent dial.

Other objects of the invention will appear from the following description taken in connection with the drawing, which forms a part of this specification, and in which:

Fig. 1 is a view of the front part of a motor vehicle embodying my invention, the view being taken from the front seat of the vehicle and looking forwardly as from the driver's position;

Fig. 2 is an enlarged vertical section substantially on the lines 2—2 of Figs. 1 and 3, and Fig. 3 is a face view of the parts shown in Fig. 2, some parts being shown in section substantially on the line 3—3 of said Fig. 2.

Referring to the drawing, 10 represents in general the body of a motor vehicle, 11 being the two uprights at both sides of the front part of the vehicle, and 12 being the bonnet or hood extending forwardly thereof. This bonnet portion is shown both in Figs. 1 and 2.

Extending across from one side to the other of the body is an instrument board or panel 13 in which the speedometer and other instruments of the vehicle are usually mounted. The other instruments are not shown in the drawing at all and the speedometer is shown as moved to its new location in accordance with this invention.

Mounted in its usual position is a steering post 14 upon the upper end of which is the steering wheel 15 shown as having three spokes 16, and in the central or straight-ahead position of the road wheels the steering wheel 15 is preferably so connected that its two upper spokes extend diagonally as shown in Fig. 1 so that there is a large space between them at the top of the wheel. It is through this space that the operator looks at the speedometer which is about to be described.

There is a space or opening in the body between the uprights 11 and this is preferably closed by a windshield 17 which may or may not be adapted to be opened and closed. In Figs. 1 and 2 this windshield is shown in its closed position and the windshield frame 18 is shown as closed tightly against a flange 19 extending above the rear end of the bonnet 12. This flange 19 is made in the form of an extension of the instrument panel 13, as will be particularly seen in Fig. 2.

With this construction of body opening and windshield it will be seen that the lower edge of the windshield, so far as observation through it is concerned, coincides with the upper edge of the flange 19, or to be more exact perhaps, with the upper edge of the lower strip of the windshield frame 18 shown in Fig. 2.

In this invention the indicator device of the speedometer of the vehicle is mounted so that it may be observed by the operator with the least movement of his eyes from a straight-ahead position down the road. Thus the dial 20 of the speedometer is mounted within the edge of the windshield itself, that is, above the lower edge of the windshield, and particularly, this dial is shown as so mounted that it may be observed as the operator looks through the steering wheel 15 and simultaneously through the lower part of the windshield. The dial is preferably made transparent so that the light from outside will cause the dial to appear of a light shade and the figures thereon to stand out in bold relief, the figures being preferably painted in a dark or black color.

The dial 20 is shown as supported by a surrounding frame 21 parallel to and offset slightly to the rear of the windshield 17, and this frame extends downwardly and is connected to the outer casing of a speedometer 22. The speedometer in turn is supported on brackets 23 from any suitable part of the vehicle body as from the instrument board 13. The mechanism of the speedometer 22 is not particularly illustrated as it is immaterial what particular type of speedometer mechanism is employed. Its operating cable is shown at 24 and this of course extends to an operating part of the vehicle. Extending from the speedometer casing 22 is the usual oscillating shaft 25 upon which is mounted the indicating hand 26. This hand extends upwardly in juxtaposition to the dial 20, the hand being so mounted that its oscillating path of movement is parallel to the dial 20 and consequently parallel to the windshield 17. Thus the indicating hand 26, extending upwardly as it does, moves across a portion of the opening in the vehicle body so that it can be observed by the operator of the vehicle while looking through that opening. In other words, the hand 26 extends above the lower edge of the windshield while the body or casing of the speedometer itself is mounted below the windshield and is hidden by the instrument board. Only the dial and indicating hand of the speedometer are visible to the operator.

For illumination at night the dial 20 may have associated therewith an elongated bulb 27, this bulb being mounted at the lower edge of the glass dial 20 so that the light from the bulb projects upwardly through the glass and thus illuminates the numerals 28 on the dial. This glow illumination of the glass dial itself will form a desirable background for the indicating hand 26 which moves across it and the position of the hand is thus made visible to the operator when the vehicle is otherwise dark.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, in combination, a vehicle body having an opening therein, a glass window for the opening, a speedometer mounted in the body and having an indicating hand extending into the area at one side of and bounded by lateral extensions of the defining lines of said opening to a position for observation while looking outwardly through said window, and a transparent dial for said indicating hand.

2. In a motor vehicle, in combination, a vehicle body having an opening therein, a glass window for the opening, a speedometer mounted in the body and having an indicating hand extending into the area at one side of and bounded by lateral extensions of the defining lines of said opening to a position for observation while looking outwardly through said window, and an illuminated transparent dial for said indicating hand.

3. In a motor vehicle, in combination, a body having an instrument board, a speedometer concealed behind the instrument board and having a hand extending above said board, a transparent dial for said hand, and a windshield parallel to and offset from said dial.

4. In a motor vehicle, in combination, a vehicle body having an opening therein, a glass window for the opening, a speedometer mounted in the body and having an indicating hand extending to a position for observation while looking outwardly through said window, and a transparent dial for said hand arranged parallel to and between said hand and said window.

5. In a motor vehicle, in combination, a vehicle body having an opening therein, a speedometer having an indicating hand mounted to move across an unobstructed portion of said opening for observation by a person in the vehicle, and a transparent dial for the speedometer arranged adjacent to and at one side of the path of travel of said hand, said dial being arranged relative to said opening so that said person may see through the transparent dial and through the opening simultaneously.

6. In a motor vehicle, in combination, a vehicle body having an opening therein, a speedometer having an indicating hand mounted to move across an unobstructed portion of said opening for observation by the operator of the vehicle, a transparent dial for the speedometer arranged adjacent to and at one side of the path of travel of said hand, said dial being arranged relative to said opening so that the operator may see through the transparent dial and through the opening simultaneously, and artificial illuminating means for illuminating the insignia on the dial when there is an absence of light outside the vehicle body.

7. A speedometer device or the like comprising a transparent dial unobstructed front and rear so that daylight may be seen through it, an indicating hand mounted for movement in a path parallel to the surface of the dial and in juxtaposition to the dial figures, and edgewise lighting means for the dial forming glow illumination therefor and a light background for the indicating hand without objectionable reflections.

8. A speedometer device or the like comprising a transparent dial unobstructed front and rear so that daylight may be seen through it, an indicating hand mounted for movement in a path parallel to the surface of the dial and in juxtaposition to the dial figures, and glow illumination means for the dial forming a light background for the indicating hand, said illumination means and the surfaces of said dial being so related that there are no objectionable light reflections to the eye of the observer.

9. In a motor vehicle, the combination with the steering wheel and the windshield mounted in front of the steering wheel, the horizontal area between the upper part of the steering wheel and the windshield being unobstructed, of a speedometer having an indicator device including a dial and a co-operating hand, said dial being formed so that the light from outside the vehicle will cause the dial to appear of a light shade, said speedometer being supported with its indicator device in said area between the steering wheel and the windshield in such position that said device may be observed by the operator when looking substantially horizontally through the steering wheel and the windshield simultaneously.

10. In a motor vehicle, the combination of the windshield and the steering wheel mounted in the body at the rear of the windshield, said steering wheel having its spokes arranged so that there is a clear space inside the upper part of the wheel when the road wheels are in straight-ahead position, the horizontal area between the upper part of the steering wheel and the windshield being unobstructed, of a speedometer having an indicator device including a dial and a co-operating hand, said dial being formed so that the light from outside the vehicle will cause the dial to appear of a light shade, said speedometer being supported with its indicator device in said area between the steering wheel and the windshield in such position that said device may be observed by the operator when looking substantially horizontally through the windshield and the upper part of the steering wheel simultaneously.

11. In a motor vehicle, in combination, a vehicle body having an opening therein, a glass window for the opening, a speedometer or the like mounted in the body and having an indicator device including a dial and a co-operating hand, said dial being formed so that the light from outside the vehicle will cause the dial to appear of a light shade, said indicator device extending into the area of the window opening to a position for observation while looking outwardly through said window and said area being unobstructed rearwardly of said device.

12. In a motor vehicle, in combination, a vehicle body having an opening therein, and a speedometer or the like having an indicator device including a dial and a co-operating hand, one of which is movable and the other stationary, said dial formed to appear of a light shade, said indicator device extending into the area of said opening and the movable part of said device mounted to move across an unobstructed portion of said opening so it can be observed by the operator of the vehicle while looking outwardly through said opening.

13. In a motor vehicle, in combination, a vehicle body having an opening therein, and a speedometer or the like having an indicating device including a transparent dial and a co-operating hand, one of said latter parts being movable and the other stationary, the movable part of said device being mounted to move across an unobstructed portion of said opening, and said device being so arranged relative to said opening that a person in the vehicle may see through the transparent dial and the opening simultaneously.

14. A speedometer device or the like comprising a figured dial and an indicator hand, one of which is movable and the other stationary and which dial and hand are in juxtaposition to each other, said dial being formed so that light from behind it will cause it to appear of a light shade, and glow illumination means for the dial forming a light background for the indicator hand, said illumination means and the surfaces of the dial being so related that there are no objectionable light reflections to the eye of the observer.

MILTON TIBBETTS.